(12) United States Patent
Huang

(10) Patent No.: US 9,354,452 B2
(45) Date of Patent: May 31, 2016

(54) LIGHT-FIELD IMMERSIVE DISPLAY AND OPERATION METHOD THEREOF

(71) Applicant: DELTA ELECTRONICS, INC., Kuei San (TW)

(72) Inventor: June-Jei Huang, Kuei San (TW)

(73) Assignee: DELTA ELECTRONICS, INC. (TW)

( * ) Notice: Subject to any disclaimer, the term of this patent is extended or adjusted under 35 U.S.C. 154(b) by 61 days.

(21) Appl. No.: 14/528,733

(22) Filed: Oct. 30, 2014

(65) Prior Publication Data

US 2016/0048030 A1    Feb. 18, 2016

(30) Foreign Application Priority Data

Aug. 14, 2014 (TW) .............................. 103127865 A

(51) Int. Cl.
| | |
|---|---|
| G02B 27/22 | (2006.01) |
| G03B 21/00 | (2006.01) |
| G03B 21/13 | (2006.01) |
| G03B 21/602 | (2014.01) |

(52) U.S. Cl.
CPC .......... G02B 27/2264 (2013.01); G03B 21/006 (2013.01); G03B 21/13 (2013.01); G03B 21/602 (2013.01)

(58) Field of Classification Search
None
See application file for complete search history.

(56) References Cited

U.S. PATENT DOCUMENTS

| | | | | |
|---|---|---|---|---|
| 4,874,235 | A * | 10/1989 | Webster | .................... G02B 6/06 351/158 |
| 5,274,480 | A * | 12/1993 | Hirai | ..................... H04N 9/315 348/E9.027 |
| 6,141,034 | A | 10/2000 | McCutchen | |
| 6,813,074 | B2 | 11/2004 | Starkweather | |
| 7,901,093 | B2 | 3/2011 | Tan et al. | |
| 8,567,953 | B2 | 10/2013 | O'Dor et al. | |
| 2008/0185415 | A1 * | 8/2008 | Huang | ..................... B25C 1/04 227/8 |
| 2010/0026795 | A1 | 2/2010 | Moller et al. | |

FOREIGN PATENT DOCUMENTS

| | | |
|---|---|---|
| CN | 102778807 | 11/2012 |
| TW | 200426487 | 12/2004 |
| TW | 200737937 | 10/2007 |

* cited by examiner

*Primary Examiner* — Ashok Patel
(74) *Attorney, Agent, or Firm* — Hauptman Ham, LLP

(57) ABSTRACT

A light-field immersive display includes a curved screen, at least two projectors, and at least two curved liquid crystal slits. Each of the projectors has a projected image on the curved screen. Boundaries of the two projected images are edge-blended. The curved liquid crystal slits are disposed on one side of the curved screen, and the curved liquid crystal slits are respectively disposed corresponding to the projected images.

13 Claims, 5 Drawing Sheets

LIGHT-FIELD IMMERSIVE DISPLAY AND OPERATION METHOD THEREOF

RELATED APPLICATIONS

This application claims priority to Taiwan Application Serial Number 103127865, filed Aug. 14, 2014, which is herein incorporated by reference.

BACKGROUND

1. Field of Invention

The present invention relates to a light-field immersive display and an operation method thereof.

2. Description of Related Art

Various immersive displays have been developed recently. The immersive displays offer large-area images by the configuration of plural projectors projecting in plural directions and combining plural projecting images. Viewers can change her or his viewing angle and the viewing position substantially to observe different images at the different viewing angles.

General immersive displays offer large-area images but lack for a stereoscopic displaying effect. Viewers can change the viewing angles to observe various images, but are still difficult to experience being present.

SUMMARY

The invention provides a light-field immersive display, which offers a stereoscopic displaying effect. Through curved liquid crystal slits, viewers can observe plural different images at plural timings, and viewers at different positions can observe different images, either, which produces an immersive and stereoscopic displaying effect.

One aspect of the present invention provides a light-field immersive display, including a curved screen, at least two projectors, and at least two curved liquid crystal slits. Each of the projectors has a projected image on the curved screen, and plural boundaries of the two projected images are edge-blended. The curved liquid crystal slits are disposed on one side of the curved screen, and the curved liquid crystal slits are disposed corresponding to the projected images respectively.

In one or more embodiments of the present invention, the boundaries of the projected images have a lower light intensity respectively, so that after the boundaries of the two projected images are edge-blended, the light intensity of the common boundaries of the projected images is close to the light intensity of plural centers of the projected images.

In one or more embodiments of the present invention, each of the projected images includes plural image units, the image units are switched according to a time sequence, each of the curved liquid crystal slits includes plural sub-units, and the sub-units are turned on according to the same time sequence, so that each of the image units is projected to a visual space in plural directions, through each of the on-state sub-units.

In one or more embodiments of the present invention, a central angle of the curved screen is about 180 degrees.

In one or more embodiments of the present invention, an angle between two projection directions of each two adjacent projectors is substantially in the range of 45 degrees to 90 degrees.

In one or more embodiments of the present invention, the curved screen includes a diffusely reflecting plate for reflecting light uniformly.

In one or more embodiments of the present invention, the curved screen includes at least one fresnel lens sheet, and the fresnel lens sheet is disposed on one side of the diffusely reflecting plate facing the curved liquid crystal slits.

In one or more embodiments of the present invention, one of the projectors is disposed under a focal point of the fresnel lens sheet.

In one or more embodiments of the present invention, the projectors are disposed on the same side of the curved screen.

In one or more embodiments of the present invention, the curved liquid crystal slits are mutually connected.

Another aspect of the present invention provides a method for operating a light-field immersive display. The method includes providing at least two curved liquid crystal slits and at least two projectors, in which the projectors have plural projected images on a curved screen respectively, the curved liquid crystal slits are disposed corresponding to the projected images respectively, and each of the curved liquid crystal slits includes plural sub-units; turning on one of the sub-units according to a time sequence; and switching plural image units of the projected images according to the same time sequence, so that one of the image units is projected to a visual space in plural directions through one of the sub-units.

In one or more embodiments of the present invention, the curved liquid crystal slits include N sub-units, the sub-units are switched at a rate of 60×N times per second, and the projectors also switch the image units at the same rate.

In one or more embodiments of the present invention, the method includes turning on a first sub-unit at a first timing, and switching to display a first image unit, in which the first image unit is projected through the first sub-unit to plural positions, one of the positions receives a portion of the first image unit, and another one of the positions receives another portion of the first image unit; and turning on a second sub-unit at a second timing, and switching to display a second image unit, in which the second image unit is projected through the second sub-unit to the positions, one of the positions receives a portion of the second image unit, and another one of the positions receives another portion of the second image unit.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
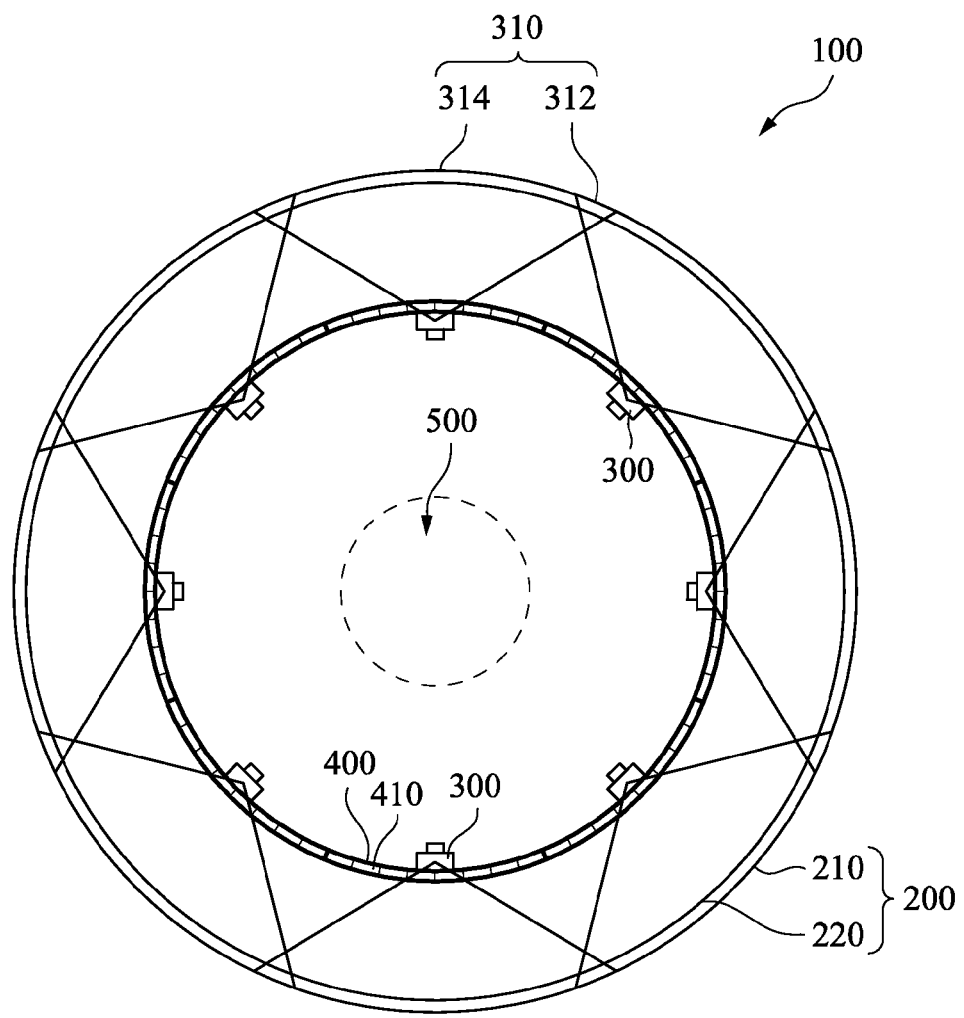
FIG. 1 is a schematic diagram of a light-field immersive display according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram of a light-field immersive display 100 according to one embodiment of the present invention. The light-field immersive display 100 includes a curved screen 200, at least two projectors 300, and at least two curved liquid crystal slits 400. Each of the projectors 300 has a projected image 310 on the curved screen 200. The curved liquid crystal slits 400 are disposed on one side of the curved screen 200 facing a visual space 500, and the curved liquid crystal slits 400 are disposed corresponding to the projected images 310 respectively.

The projected images 310 include plural boundaries 312 and plural centers 314. The boundaries 312 of the two adjacent projected images 310 are edge-blended. In one or more embodiments of the present invention, the boundaries 312 of the projected images 310 have a lower light intensity, so that after the boundaries 312 of the two adjacent projected images 310 are edge-blended, the light intensity of the common boundaries 312 of the projected images 310 is close to the light intensity of the centers 314 of the projected images 310.

For example, the light intensity of the boundaries 312 of the projected images 310 is about half of the light intensity of the centers 314 of the projected images 310, so that after the boundaries 312 are edge-blended, the light intensity of the common boundaries 312 equals substantially to the light intensity of the centers 314. Therefore, viewers can observe images with uniform light intensity on the curved screen 200. Herein, the amount and the projecting directions of the projectors 300 should be configured to enable two adjacent projecting images 310 to be edge-blended. In this embodiment, an angle between two projection directions of each two adjacent projectors 300 is substantially in the range of 45 degrees to 90 degrees. In this range, the edges of the projected images 310 are overlapped well, so that the boundaries 312 and the centers 314 of the projected images 310 on the curved screen 200 can offer a better visual effect.

Regarding to the configuration of the curved screen 200, a center of the circle of the curved screen 200 is ideally disposed in the visual space 500. A central angle of the curved screen 200 shown in FIG. 1 is about 360 degrees, which let the viewers be well immersed in the stereoscopic displaying images. The degrees of the central angle of this embodiment should not limit the scope of the present invention.

Figure 2:
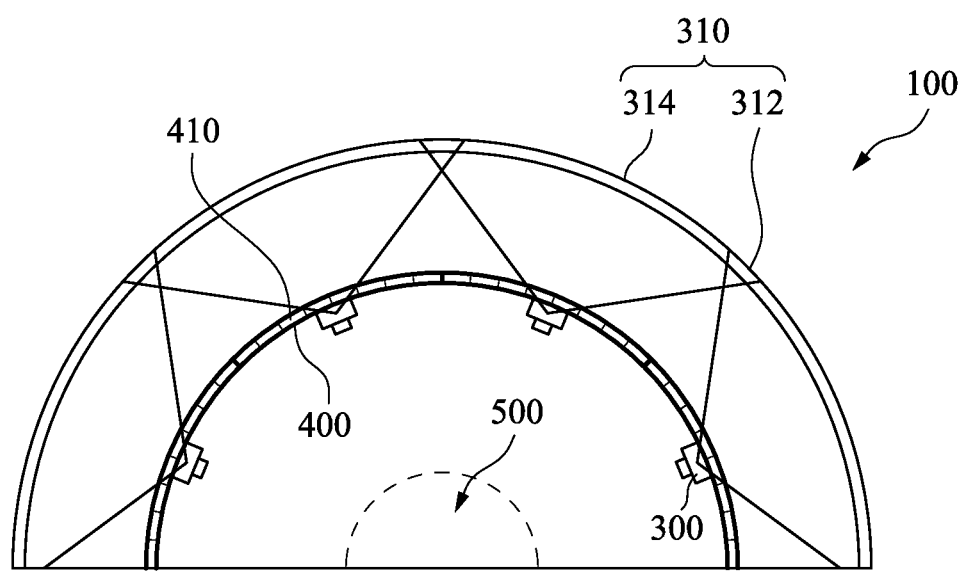
FIG. 2 is a schematic diagram of a light-field immersive display according to another embodiment of the present invention.

FIG. 2 is a schematic diagram of a light-field immersive display 100 according to another embodiment of the present invention. In one or more embodiments of the present invention, the central angle of the curved screen 200 can be about 180 degrees. That is, the curved screen 200 is a screen of semicircle. This configuration also allows the viewers to be immersed in the stereoscopic displaying images.

Referring back to FIG. 1, the curved screen 200 includes a diffusely reflecting plate 210 and at least one fresnel lens sheet 220. The fresnel lens sheet 220 is disposed on one side of the diffusely reflecting plate 210 facing the curved liquid crystal slits 400. The diffusely reflecting plate 210 is used to receive the light from projectors 300 and reflect the light uniformly to the visual space 500. The fresnel lens sheet 220 is used to improve the distribution of the light, so that the light can be emitted to the visual space 500 well.

Figure 3:
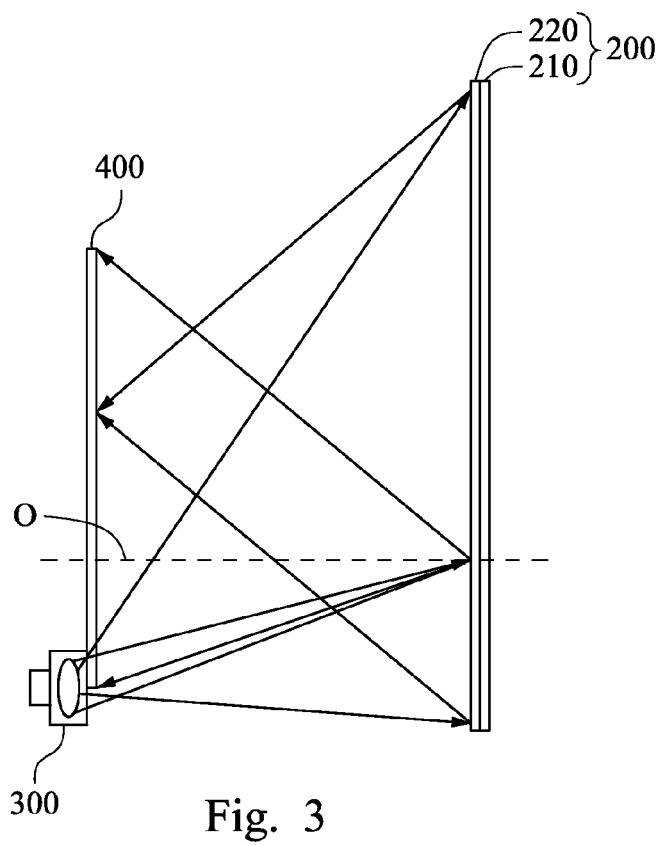
FIG. 3 is a side view of the light-field immersive display of FIG. 1.

FIG. 3 is a side view of the light-field immersive display 100 of FIG. 1. The fresnel lens sheet 220 has an optical axis O, which refers to the shortest connection line between the focal point of the fresnel lens sheet 220 and the fresnel lens sheet 220. The projectors 300 are disposed under the optical axis O of the fresnel lens sheet 220. Ideally, the projectors 300 are disposed under plural focal points of the fresnel lens sheet 200. As a result, the projectors 300 do not block the line of sight from the visual space 500, and the fresnel lens sheet 200 can well adjust the directions of light.

Reference is now made to both FIG. 1 and FIG. 3. The heights of the curved liquid crystal slits 400 and the projectors 300 are designed to be different. The curved liquid crystal slits 400 and the projectors 300 are next to each other in FIG. 1, but the fact is, as shown in FIG. 3, the curved liquid crystal slits 400 are substantially disposed above the projectors 300.

In this embodiment, though the curved liquid crystal slits 400 are substantially disposed above the projectors 300, it should not limit the scope of the present invention. In practice, the projectors 300 can be disposed between the liquid crystal curved slits 400 and the curved screen 200, or the liquid crystal curved slits 400 can be disposed between the projectors 300 and the curved screen 200.

In one or more embodiments, the projectors 300 and the liquid crystal curved slits 400 are disposed on the same side of the curved screen 200, which is a configuration of front projection. In configuration of the front projection, the distance between the curved screen 200 and the liquid crystal curved slits 400 and the distance between the curved screen 200 and the projectors 300 are overlapped. Therefore, the size of the light-field immersive display 100 can be reduced.

Referring back to FIG. 1, in one or more embodiments, each of the liquid crystal curved slits 400 is disposed corresponding to each of the projecting images 310, but in fact, the liquid crystal curved slits 400 can be connected and form a single overall liquid crystal slit, which includes plural liquid crystal curved slits 400 disposed corresponding to the projected images 310 respectively. In other words, the liquid crystal curved slits 400 can be fabricated together, and the function of the liquid crystal curved slits 400 do not change.

Figure 4:
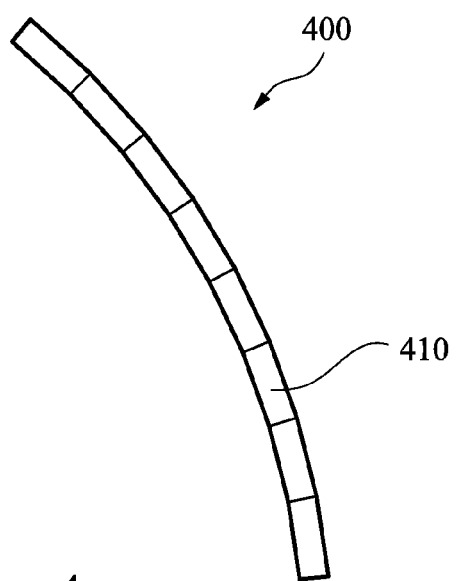
FIG. 4 is a schematic diagram of one of curved liquid crystal slits of the light-field immersive display of FIG. 1.

Reference is now made to both FIG. 1 and FIG. 4. FIG. 4 is a schematic diagram of one of the curved liquid crystal slits 400 of the light-field immersive display of FIG. 1. Each of the curved liquid crystal slits 400 includes plural sub-units 410. Each of the sub-units 410 is a liquid crystal cell, which can control the polarization states of the light. By well configuration of the polarization states of the incident light, the transmittance of the sub-units 410 can be changed by the sub-units 410. That is, the light can be controlled to pass through the sub-units 410 or not to pass through the sub-units 410. Herein, the sub-units 410 can be liquid crystal cells with plane substrates, or the sub-units 410 can be liquid crystal cells with curved substrates.

Referring back to FIG. 1, in one or more embodiments of the present invention, each of the projected images 310 includes plural image units (not shown in the figure), and the image units are switched according to a time sequence. The sub-units 410 of the curved liquid crystal slits 400 are turned on according to the same time sequence. As a result, each of the image units passes through each of the sub-units 410, and then plural portions of each of the image units are projected to a visual space 500 in plural directions, through each of the on-state sub-units 410.

Figure 5A:
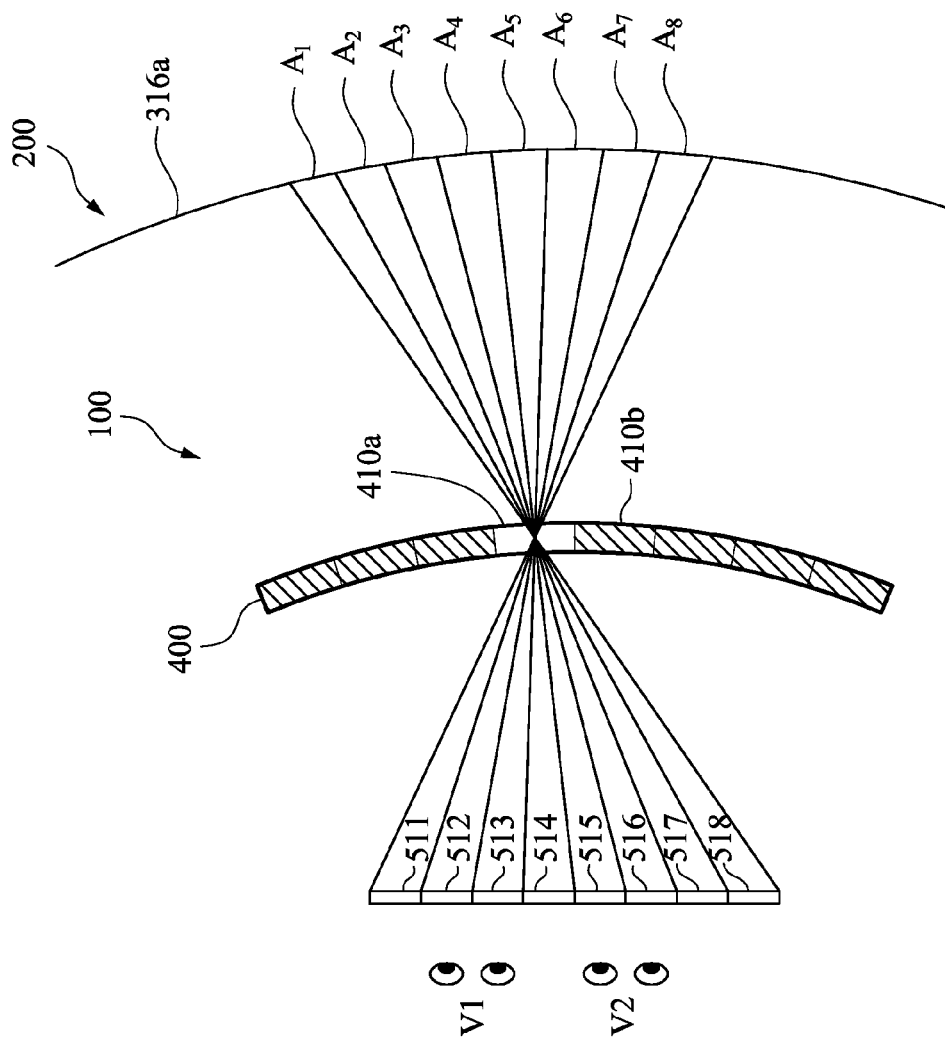
FIG. 5A to FIG. 5B are operating schematic diagrams of a light-field immersive display according to another embodiment of the present invention.
Figure 5B:
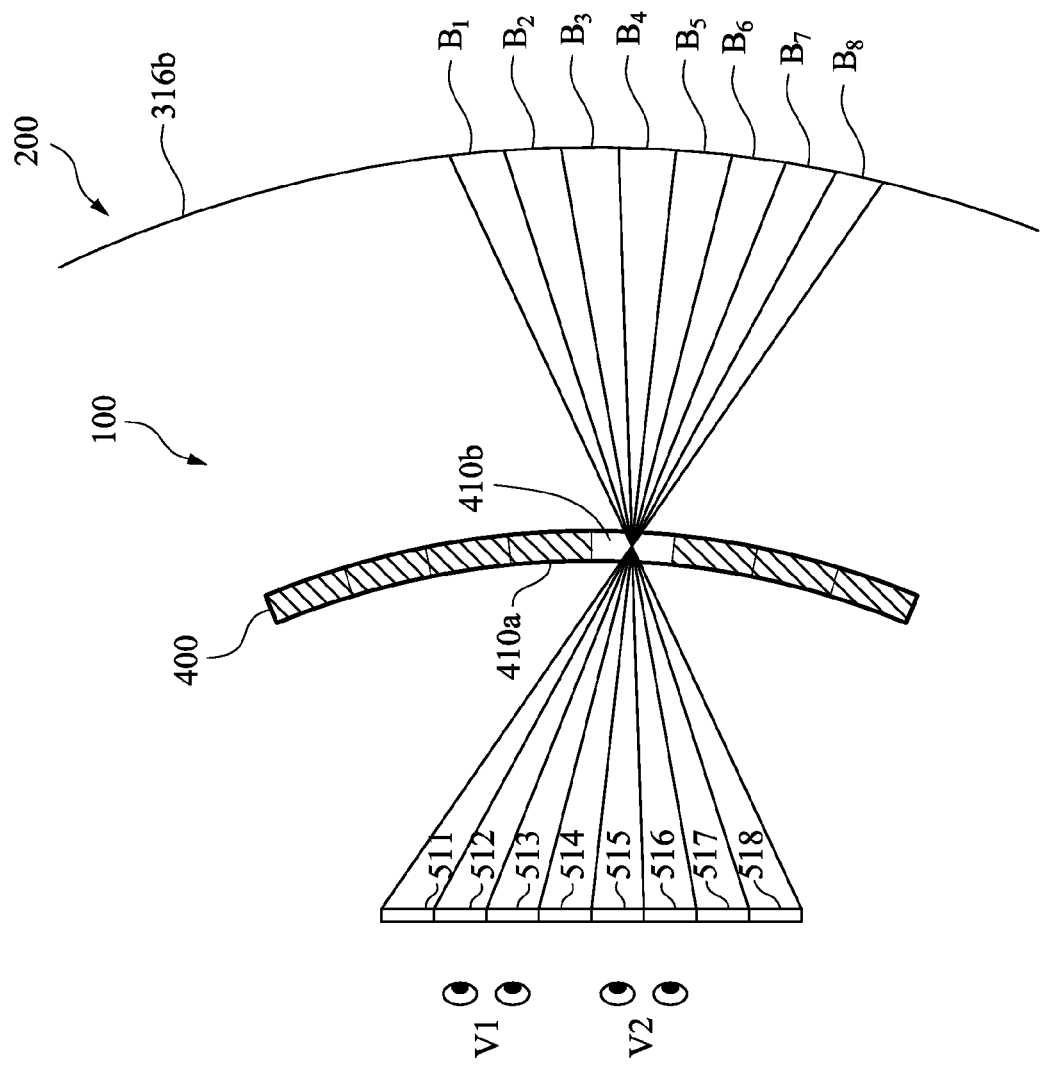

Reference is now made to FIG. 1, FIG. 5A, and FIG. 5B. FIG. 5A to FIG. 5B are operating schematic diagrams of a light-field immersive display according to another embodiment of the present invention. Another aspect of the present invention provides a method for operating a light-field immersive display 100. The method includes providing the light-field immersive display 100 stated above in FIG. 1, and the light-field immersive display 100 includes the curved screen 200, the projectors 300, and the curved liquid crystal slits 400. Herein, for clear illustration, the projectors 300 and the light emitted from the projectors 300 are not shown in FIG. 5A and FIG. 5B. A first image unit 316a and a second image unit 316b projected form the projectors 300 on the curved screen 200 are directly shown in FIG. 5A and FIG. 5B respectively. The reflected directions of light of the first image unit 316a and the second image unit 316b at the curved screen 200 are also shown in FIG. 5A and FIG. 5B respectively. Herein, the first image unit 316a and the second image unit 316b are the sequentially switched image units of the projected images 310 shown in FIG. 1.

To be specific, each of the curved liquid crystal slits 400 includes a first sub-units 410a and a second sub-units 410b. Each of the projected images includes a first image unit 316a and a second image unit 316b shown in a time sequence. In the operation of the light-field immersive display 100, one of the first sub-units 410a and the second sub-units 410b are turned on according to the time sequence, and one of the first image unit 316a and the second image unit 316b is switched on according to the same time sequence. Therefore, one of the first image unit 316a and the second image unit 316b passes through one of the first sub-units 410a and the second sub-units 410b and then projected to the visual space 500 in plural directions.

In detail, in one or more embodiments of the present invention, the method for operating the light-field immersive display 100 includes turning on the first sub-unit 410a and switching to display the first image unit 316a at a first timing, and then turning on the second sub-unit 410b and switching to display the second image unit 316b at a second timing. Herein, the sub-units are left blank as being on state, such as the first sub-unit 410a in FIG. 5A and the second sub-unit 410b in FIG. 5B, and the sub-units are filled with slashes as being off state, such as the second sub-unit 410b in FIG. 5A and the first sub-unit 410a in FIG. 5B.

In this embodiment, being split by the first sub-unit 410a and the second sub-unit 410b of the curved liquid crystal slits 400, the first image unit 316a and the second image unit 316b include plural portions $A_1 \sim A_i$, $B_1 \sim B_i$ respectively, in which the parameter i is a positive integer. Herein, the parameter i equals to 8. That is, the first image unit 316a and the second image unit 316b include plural portions $A_1 \sim A_8$, $B_1 \sim B_8$ respectively. In fact, the value of the parameter i depends on the width of two eyes, the distance from the curved screen 200 to the viewer, etc. The value of i of this embodiment should not limit the scope of the present invention.

Referring to FIG. 5A, the method includes turning on the first sub-unit 410a and switching to display the first image unit 316a at a first timing. As a result, the first image unit 316a passes through the first sub-unit 410a to arrive at plural positions 511~518 of the visual space 500, in which the positions 511~518 receive the portions $A_1 \sim A_8$ respectively. For example, the position 512 receives the portion $A_7$ of the first image unit 316a, and the position 514 receives the portion $A_5$ of the first image unit 316a.

Referring to FIG. 5B, the method includes turning on the second sub-unit 410b and switching to display the second image unit 316b at a second timing. As a result, the second image unit 316b is projected through the second sub-unit 410b to the positions 511~518, in which the positions 511~518 receive the portions $B_1 \sim B_8$ respectively. For example, the position 512 receives the portion $B_7$ of the second image unit 316b, and the position 514 receives the portion $B_5$ of the second image unit 316b.

Therefore, when the left and right eyes of the viewer V1 are corresponding to the positions 512 and 513, at the first timing, the two eyes receive different images, which are the portions $A_6$, $A_7$, and at the second timing, the two eyes receive different images, which are the portions $B_6$, $B_7$. Herein, after the first timing and the second timing, due to the persistence of vision, the right eye of the viewer V1 receives the portions $A_6$ and $B_6$ subsequently, and generates consecutive images from the portions $A_6$ and $B_6$; and the left eye of the viewer V1 receives the portions $A_7$ and $B_7$ subsequently, and generates consecutive images from the portions $A_7$ and $B_7$. As a result, the viewer V1 experiences the dynamic stereoscopic effect.

On the other hand, the left and right eyes of another viewer V2 are corresponding to the positions 515 and 516. At the first timing, the two eyes receive different images, which are the portions $A_3$, $A_4$, and at the second timing, the two eyes receive different images, which are the portions $B_3$, $B_4$. Similarly, after the first timing and the second timing, due to the persistence of vision, the right eye of the viewer V2 receives the portions $A_3$ and $B_3$, and produces consecutive images therefrom, and the left eye of the viewer V2 receives the portions $A_4$ and $B_4$, and produces another consecutive images therefrom. As a result, the viewer V2 experiences the dynamic stereoscopic effect.

In this embodiment, since the positions 512, 513, and the positions 515, 516 do not receive the same images, the viewers V1, V2 observe different stereoscopic images. As a result, the stereoscopic images can be designed according to the positions of the viewers for more real stereoscopic effect.

In other words, by switching the first sub-unit 410a, the second sub-unit 410b, and the first image unit 316a, the second image unit 316b sequentially, viewers at different positions 511~518 receive different portions $A_1 \sim A_8$, $B_1 \sim B_8$ at different timings respectively. As a result, the viewers V1, V2 can observe the stereoscopic images, and can further observe different the stereoscopic images at different positions.

In one or more embodiment, the curved liquid crystal slits 400 include plural N sub-units, such as the first sub-unit 410a and the second sub-unit 410b. Ideally, the sub-units of the curved liquid crystal slits 400 are switched at a rate of at least 60×N times per second, in which the on-state sub-unit is turned off, and another one of the off-state sub-unit is turned on. The image units of the projectors 300 are switched at the same rate, such as the first image unit 316a and the second image unit 316b.

In this embodiment, only one of the sub-units is turned on at certain timing, but it should not limit the scope of the present invention. The sub-units of one of the curved liquid crystal slits can be grouped into plural groups, and only one of the sub-units of each group is turned on at certain timing. In other words, each of the curved liquid crystal slits can have plural on-state sub-units at certain timing. If each of the groups includes M sub-units, the sub-units should be switched at a rate of at least 60×M times per second, and the image units of the projectors are switched at the same rate. This configuration enhances the brightness of the stereoscopic images but decreases the degrees of differentiation of the light directions, which may lower the effect of stereoscopic visualization.

The invention provides a light-field immersive display, which offers a stereoscopic displaying effect. Through the curved liquid crystal slits, viewers can observe different images at different timings, and viewers at different positions can observe different images, either, which produces an immersive and stereoscopic displaying effect.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light-field immersive display, comprising:
   a curved screen;
   at least two projectors, wherein each of the projectors has a projected image on the curved screen, and a plurality of boundaries of the two projected images are edge-blended; and
   at least two curved liquid crystal slits, disposed on one side of the curved screen, wherein the curved liquid crystal slits are disposed respectively corresponding to the projected images.

2. The light-field immersive display of claim 1, wherein the boundaries of the projected images respectively have a lower light intensity, so that after the boundaries of the two projected images are edge-blended, the light intensity of the common boundaries of the projected images is close to the light intensity of a plurality centers of the projected images.

3. The light-field immersive display of claim 1, wherein each of the projected images comprises a plurality of image units that are switched according to a time sequence, and each of the curved liquid crystal slits comprises a plurality of sub-units that are turned on according to the same time sequence, so that each of the image units is projected to a visual space in a plurality of directions, through each of the on-state sub-units.

4. The light-field immersive display of claim 1, wherein a central angle of the curved screen is about 180 degrees.

5. The light-field immersive display of claim 1, wherein an angle between two projection directions of each two adjacent projectors is substantially in the range of 45 degrees to 90 degrees.

6. The light-field immersive display of claim 1, wherein the curved screen comprises a diffusely reflecting plate for reflecting light uniformly.

7. The light-field immersive display of claim 6, wherein the curved screen comprises at least one fresnel lens sheet that is disposed on one side of the diffusely reflecting plate facing the curved liquid crystal slits.

8. The light-field immersive display of claim 7, wherein one of the projectors is disposed under a focal point of the fresnel lens sheet.

9. The light-field immersive display of claim 1, wherein the projectors are disposed on the same side of the curved screen.

10. The light-field immersive display of claim 1, wherein the curved liquid crystal slits are mutually connected.

11. A method for operating a light-field immersive display, comprising:
    providing at least two curved liquid crystal slits and at least two projectors, wherein the projectors respectively have a plurality of projected images on a curved screen, the curved liquid crystal slits are disposed respectively corresponding to the projected images, and each of the curved liquid crystal slits comprises a plurality of sub-units;
    turning on one of the sub-units according to a time sequence; and
    switching a plurality of image units of the projected images according to the same time sequence, so that one of the image units is projected to a visual space in a plurality of directions through one of the sub-units.

12. The operating method of a light-field immersive display of claim 11, wherein the curved liquid crystal slits comprise N sub-units that are switched at a rate of 60×N times per second, and the projectors also switch the image units at the same rate.

13. The operating method of a light-field immersive display of claim 11, further comprising:
    turning on a first sub-unit at a first timing, and switching to display a first image unit, wherein the first image unit is projected through the first sub-unit to a plurality of positions, one of the positions receives a portion of the first image unit, and another one of the positions receives another portion of the first image unit; and
    turning on a second sub-unit at a second timing, and switching to display a second image unit, wherein the second image unit is projected through the second sub-unit to the positions, one of the positions receives a portion of the second image unit, and another one of the positions receives another portion of the second image unit.

* * * * *